US007761210B2

(12) United States Patent
Baginski et al.

(10) Patent No.: US 7,761,210 B2

(45) Date of Patent: Jul. 20, 2010

(54) INDUSTRIAL TRUCK WITH A LOAD SUPPORTING MEANS

(75) Inventors: Ralf Baginski, Neetze (DE); Frank Manken, Henstedt-Ulzburg (DE); Martin VonWerder, Ammersbek (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 438 days.

(21) Appl. No.: 11/692,631

(22) Filed: Mar. 28, 2007

(65) Prior Publication Data

US 2007/0233314 A1 Oct. 4, 2007

(30) Foreign Application Priority Data

Mar. 29, 2006 (DE) ..................... 10-2006-014-447

(51) Int. Cl.
*G06F 7/70* (2006.01)

(52) U.S. Cl. ........................... 701/50; 701/49; 172/4.5; 172/9

(58) Field of Classification Search ................... 701/49, 701/50; 172/4.5, 9; 340/10.32, 572.1, 686.6
See application file for complete search history.

(56) References Cited

U.S. PATENT DOCUMENTS 4,888,593 A * 12/1989 Friedman et al. ............ 342/387
5,254,997 A * 10/1993 Cohn .......................... 342/44
5,260,694 A * 11/1993 Remahl ...................... 340/674
6,785,597 B1 * 8/2004 Farber et al. .................. 701/50
2006/0058913 A1 * 3/2006 Andersen et al. ............ 700/214

FOREIGN PATENT DOCUMENTS

EP 1 444 647 B1 2/2006

* cited by examiner

*Primary Examiner*—Gertrude Arthur Jeanglaud
(74) *Attorney, Agent, or Firm*—Vidas, Arrett & STeinkraus

(57) ABSTRACT

An industrial truck with a load supporting device, a sending and receiving unit, the sending and receiving range of which is directed towards a region of the load supporting device and towards a region in front of the load supporting device, and a control unit, which activates the sending and receiving unit for the reception of data from external senders, a sensor being provided which detects a load on the load supporting device and triggers an activation of the sending and receiving unit via the control unit when the sensor has detected a load, characterized in that the sensor is integrated into a housing for the sending and receiving unit.

10 Claims, 2 Drawing Sheets

INDUSTRIAL TRUCK WITH A LOAD SUPPORTING MEANS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to an industrial truck with a load supporting means. The industrial truck is equipped with a sending and receiving unit, the sending and receiving range of which is directed towards a region of the load supporting means and towards a region in front of the load supporting means.

It is known that in the data exchange via RFID sending and receiving units, a transmission shortage may occur by reason of a multiplicity of such units and transponders in one room, because available wireless channels are not sufficiently at hand. For the simultaneous operation of many sending and receiving units, in a storeroom for instance, it is therefore aimed at limiting the activation thereof as far as possible.

A possible concept to limit the activation of the sending and receiving units is to have the activation performed by the operator, depending of the situation. In doing so, the operator can trigger the activation of the sending and receiving unit in order to activate a transponder in the sending range and to receive its emitted data. However, in this concept it is a disadvantage that the operator may forget the actuation and/or activate the sending and receiving unit unnecessarily frequently.

From US 2006/058913, the entire contents of which is incorporated herein by reference, an industrial truck is known which is equipped with gripping means for a cuboid-shaped load. The gripping elements, equipped with a flat contact wall are equipped with RFID sending and receiving units. Further, it is known to trigger the reading process of the sending and receiving units when an internal pressure sensor of the gripping elements acquires a sufficient holding pressure at the gripping elements.

From EP 1 444 647 B1, the entire contents of which is incorporated herein by reference, an industrial truck is known which uses an array of RFID reading antennas along the mast of a load supporting means. The load supporting means is equipped with a distance sensor, which measures the distance to the nearest object. When this distance falls below a predetermined minimum value, a reading process is actuated for the RFID antennas.

The present invention is based on the objective to perform the activation of a sending and receiving unit with as simple as possible means at small expense for upgrading and installation.

BRIEF SUMMARY OF THE INVENTION

The industrial truck according to the present invention has a load supporting means as well as a sending and receiving unit. Preferably, the sending and receiving unit is realised as a RFID sending and receiving unit. The sending and receiving unit has a sending and receiving range. The sending range is that range in which the signals can be received with sufficient strength by an external receiver, preferably a RFID transponder. The receiving range of the sending and receiving unit is that range in which the signals emitted by an external sender can be received with sufficient strength by the sending and receiving unit.

Further, a control unit is provided, which activates the sending and receiving unit for the reception of data from external senders. In addition, a sensor is provided on the industrial truck which detects a load on the load supporting means. The control unit triggers an activation of the sending and receiving unit when the sensor has detected a load. Thus, unnecessary activations of the sending and receiving unit are avoided. The sensor makes sure that activation takes place only when there is the possibility to read data. Thus, any unnecessary activation of the sending and receiving unit is avoided. According to the present invention, the sensor is integrated into a housing for the sending and receiving unit, through which a separate fastening of the sensor on the housing can be omitted. By doing so, the sending and receiving unit as well as the sensor can be jointly upgraded on vehicles in a particularly simple manner. The industrial truck according to the present invention has a particularly simple construction, because per se known sensors for load detection can be applied in it, which according to the present invention, are integrated into the housing of the sending and receiving unit.

In one preferred embodiment, the sending and receiving unit is realised as a RFID sending and receiving unit, which communicates with RFID transponders as an external sender. The RFID transponder is activated by a signal emitted from the sending and receiving unit, and subsequently it sends its data, which are received by the sending and receiving unit.

In one preferred embodiment, the control unit activates the sending and receiving unit for the reception of data for a predetermined period of time, when the sensor has detected a load. Through the limitation in time of the activation it is also made sure that at longer transportation travels, the sending and receiving unit is not activated for an unnecessary long time.

As already mentioned, various kinds of sensors could be used for detecting a load. Thus, for instance, it is possible to detect a load on the load supporting means on the basis of ultrasound. Alternatively, it is possible to detect a load on the load supporting means in an optical way.

In one preferred embodiment, the housing in which the sending and receiving unit as well as the sensor are provided is fixed on the vehicle's body. The housing fixed in this way is then fixedly connected with the front construction of the vehicle.

In an alternative realisation, the housing can be fixed on a mast of the load supporting means. In this it has to be differentiated whether the housing is locomotive jointly with the mast or whether the housing is fixed at a stationary position of the mast. In an advantageous realisation, the housing is fixed in the centre between the load supporting means, so that the region of the load supporting means is uniformly covered.

In one preferred embodiment, the housing is fixed below a field of sight of a driver, wherein the housing is preferably fixed as to be stationary. In this arrangement, sending and receiving unit as well as the sensor are sufficiently protected against damages.

Also, it is possible to realise the sensor as a fork occupancy sensor which is integrated into the housing of the sending and receiving unit and which recognises that there is an object on the load fork.

Advantageously, the control unit is also integrated into the sending and receiving unit, so that even for the former, separate installation can be omitted and upgrade is facilitated.

BRIEF DESCRIPTION OF THE SEVERAL VIEWS OF THE DRAWINGS

One preferred example of realisation is explained in more detail by means of the figures in the following.

DETAILED DESCRIPTION OF THE INVENTION

Figure 1:
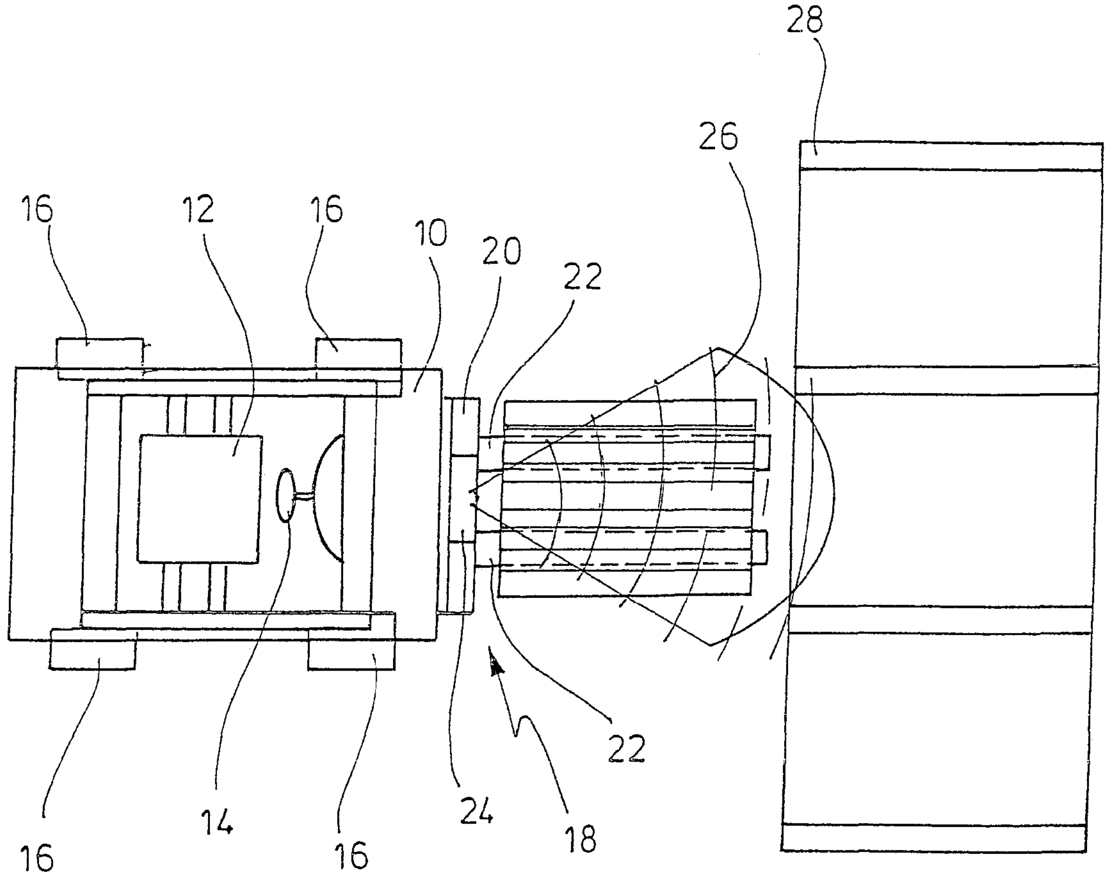
FIG. 1 shows an industrial truck with a RFID sending and receiving unit with an integrated element for the recognition of fork occupancy.

While this invention may be embodied in many different forms, there are described in detail herein a specific preferred embodiment of the invention. This description is an exemplification of the principles of the invention and is not intended to limit the invention to the particular embodiment illustrated FIG. 1 shows in a schematic top view an industrial truck 10, a driver seat 12, a steering wheel 14 and four wheels 16. In its front part 18, the industrial truck has means for lifting loads. A mast 20 is schematically shown from the topside with a slide, on which a load fork 22 is locomotive. In the region of the mast 20, a housing 24 is provided, which accommodates a sending and receiving unit for a RFID transponder.

In difference to as what is shown in the figure, it is not absolutely necessary that the housing 24 is provided in the centre between the two load forks 22. The height above the floor for the housing 24 may also vary depending on the use of the vehicle. Preferably, the housing 24 is attached sufficiently low so as not to constrain the sight of the driver on the fork, and on the fork ends in particular.

Also schematically indicated, FIG. 1 shows the sending range 26 of the sending and receiving unit in the housing 24. The sending range covers the load forks 22 and in particular the load forks in the region of the fork tips thereof. Furthermore, the sending range 26 extends also to the region in front of the load forks 22, in order to still be able to read out a transponder in a shelf 28, for instance. The actuation of the sending and receiving unit for reading a transponder on the shelf can also be triggered by the operator, for instance. For the regular operation, a separate sensor is provided, which triggers the actuation of the sending and receiving unit in response to a load. The sensor is integrated into the housing 24.

Figure 2:
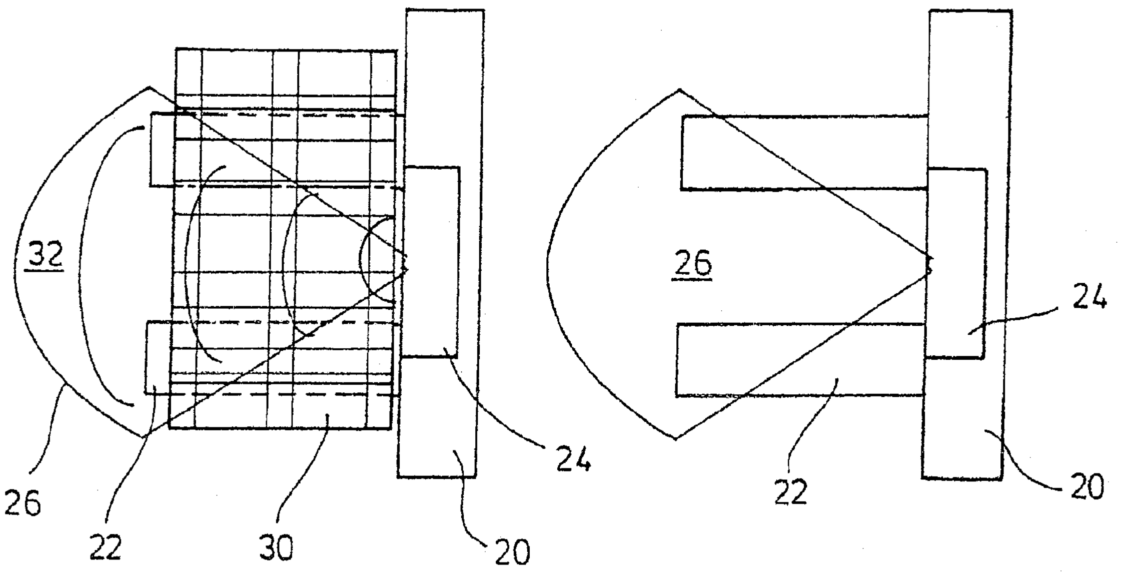
FIG. 2 shows a sending and receiving unit integrated into the mast.

In FIG. 2 the situation is shown in which a load 30 is detected in the receiving range 26 of the fork occupancy sensor. In response to this, the sending and receiving unit is activated, the emitted signals 32 of which are schematically represented as propagating waves. In another case, which is represented on the right side in FIG. 2, there is no load in the range 26 of the fork occupancy sensor, so that activation of the sending and receiving unit does not take place.

Figure 3:
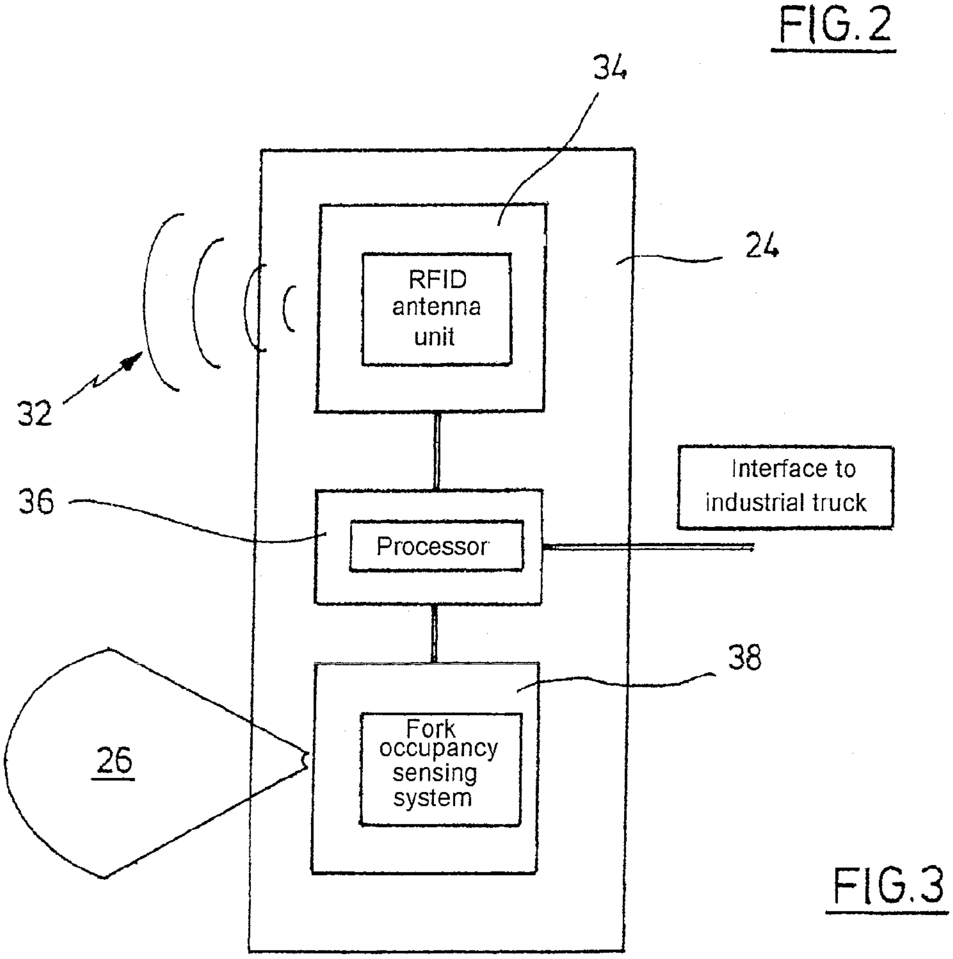
FIG. 3 shows a schematic construction of a sending and receiving unit.

In FIG. 3, the construction of a RFID sending and receiving unit 34, a control unit 36 and a fork occupancy sensor 38 is schematically shown. The sending and receiving unit 34, designated as a RFID antenna unit in FIG. 3, consists of a per se known sender and receiver of or for data of a RFID transponder, respectively. In this, a pulse of electromagnetic waves is emitted in a manner per se known, which is received by the transponder and serves for the latter as an energy supply for emitting an own pulse. The control of the sending and receiving unit 34 takes place via a control unit 36, which has a processor. The control unit 36 has one input and output at a time connected with the sending and receiving unit (no reference signs). Via input and output, control signals are sent to the sending and receiving unit and the received data of the transponders are accepted.

The control unit 36 has also one input and output at a time for communication with the fork occupancy sensing system 38. The latter may operate on the basis of ultrasound, for instance, in order to detect a load on the load fork in this way. The fork occupancy sensor has a detection range 26, in which a load 30 is recognised. The two ranges 26 and 32 are schematically represented in FIG. 3 as to be side by side. This serves only for better overview in the representation, spatially the ranges 26 and 32 overlap, so that at detected load the signals thereof can be also received.

The control unit may activate the fork occupancy sensor in order to measure an occupancy of the fork. The check whether the load fork is occupied can take place in regular intervals, for instance. Further, the control unit 36 has an input for receiving the signals of the fork occupancy sensor. When a signal is recognised, it is processed and it results in a triggering signal for the sending and receiving unit 34.

In addition, the control unit 36 is connected with a central data processing unit of the industrial truck via an interface. This may be the on-board computer of the industrial truck, for instance. It is also possible to connect the control unit 36 directly with a bus system in the industrial truck in order to exchange data for vehicle control with additional components of the industrial truck.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An industrial truck with a load supporting means (20, 22), a sending and receiving unit (34), a sending and receiving range of which is directed towards a region of the load supporting means (20, 22) and towards a region in front of the load supporting means (20, 22), and a control unit (36), which activates the sending and receiving unit (34) for the reception of data from external senders, for a predetermined period of time, a sensor (38) being provided which detects a load on the load supporting means (20, 22) and triggers an activation of the sending and receiving unit (34) via the control unit (36) when the sensor (38) has detected a load, characterised in that the sensor is integrated into a housing (24) for the sending and receiving unit (34), the housing being fixed on a mast, and further wherein the sensor (38) for detecting a load (30) detects an obstacle on the load supporting means (22) on the basis of optical or ultrasound signals.

2. Industrial truck according to claim 1, characterised in that a RFID sending and receiving unit is provided as the sending and receiving unit (34).

3. Industrial truck according to claim 1, characterised in that RFID transponders are provided as external senders.

4. Industrial truck according to claim 1, characterised in that the housing (24) is fixed in the region of the load supporting means (22).

5. Industrial truck according to claim 4, characterised in that the housing (24) is fixed on a vehicle body.

6. Industrial truck according to claim 4, characterised in that the housing (24) is fixed in the centre between the load supporting means.

7. Industrial truck according to claim 4, characterised in that the housing (24) is fixed below a field of sight of a driver.

8. Industrial truck according to claim 1, characterised in that the load supporting means (22) has a load fork (22) and the sensor is realized as a fork occupancy sensor (38).

9. Industrial truck according to claim 1, characterised in that the control unit (36) is integrated into the housing (24) for the sending and receiving unit.

10. An industrial truck comprising:

a load support comprising a mast and a load fork;

a wireless sending and receiving unit, a sending and receiving range of which encompasses a region of the load support and a region in front of the load support;

a control unit, which activates the sending and receiving unit for the reception of data from external senders, for a predetermined period of time;

a sensor being provided which detects a load on the load support and triggers an activation of the sending and receiving unit via the control unit when the sensor has detected a load, wherein the sensor is integrated into a housing for the sending and receiving unit, the housing being fixed on the mast, and further wherein the sensor (38) for detecting a load (30) detects an obstacle on the load supporting means (22) on the basis of optical or ultrasound signals.

* * * * *